C. H. Wilcox,

Sewing Machine

No. 3795. Reissued Jan. 11. 1870

The Willcox & Gibbs Sewing Machine Company by A. Pollok their attorney

WITNESSES. C. Bailey Wm. H. Wilcox

United States Patent Office.

THE WILLCOX & GIBBS SEWING-MACHINE COMPANY, OF NEW YORK, N. Y. ASSIGNEES, BY MESNE ASSIGNMENTS, OF CHARLES H. WILLCOX.

*Letters Patent No.* 42,036, *dated March* 22, 1864; *antedated May* 13, 1862; *reissue No.* 3,795, *dated January* 11, 1870.

IMPROVEMENT IN SEWING-MACHINE.

The Schedule referred to in these Letters Patent and making part of the same

*To whom it may concern:*

Be it known that I, CHARLES H. WILLCOX, of New York, in the county and State of New York, have invented certain new and useful Improvements in Sewing-Machines; and I hereby declare the following to be a full, clear, and exact description of the same, reference being had to the accompanying drawing, in which—

Figure 1:
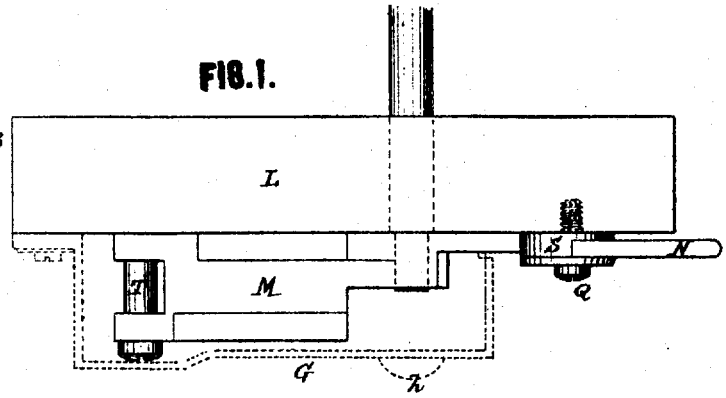
Figure 2:
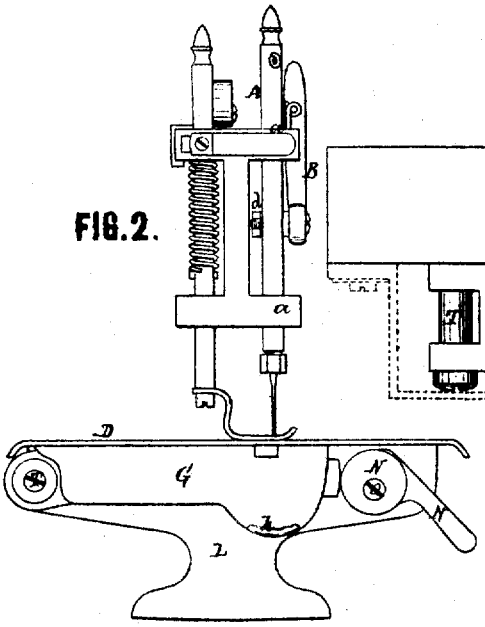
Figure 3:
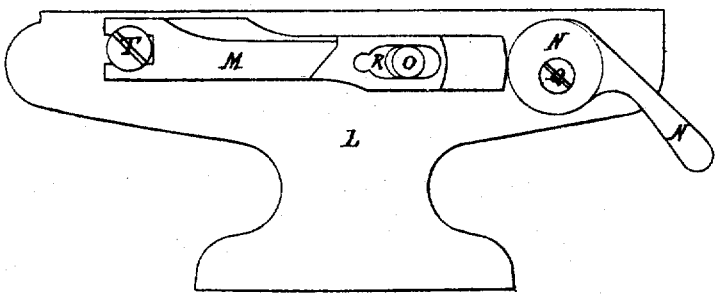
Figure 4:
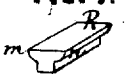
Figure 5:
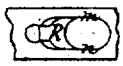
Figure 6:
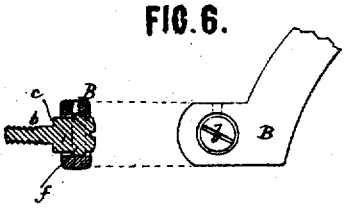

Figures 1, 2, and 3, represent a plan and front elevation of a part of a sewing-machine, to which my improvement is applied, and Figures 4, 5, and 6, are detail views.

In sewing-machines, in which the cloth or material to be sewed is moved along the sewing-table or cloth-plate, by means of a reciprocating feed-mechanism, known as the Wilson feed, and in other sewing-machines, in which the feed is enected by a mechanism, vibratory in its character, the noise attending the operation of such machine is frequently a source of great annoyance, particularly, however, in family sewing-machines, intended to be run in homes, where the clatter of the machine at work often disturbs the sleep of children or the repose of the sick.

In sewing-machines, in which the needle-bar is actuated to move up and down in a vertical plane, by means of a vibratory arm, the bar and arm have been usually connected by a pin or stud on the one, fitting in a slot in the other, or by equivalent means, this connection being rendered necessary by reason of the difference between the movements of the two; for, while the two move up and down, yet the needle-bar moves in a right line, while the vibratory arm moves in an arc of a circle, of which its pivot is the centre. The slot and stud, or equivalent connection, admit of this variation in the motions of the two, without interfering with the proper movement of the needle-bar.

It has been found, however, that the working of the stud in the slot is productive of noise, that it, in time, wears upon the parts, and that the movement of the needle-bar thereby becomes inaccurate, and the needle ceases to do its work properly.

Again, in sewing-machines employing, below the sewing-plate, a feed-device, and a mechanism for operating in conjunction with the needle, to make the stitch, it has been found that all these parts, being exposed and unprotected, are liable to be accidentally struck and injured, and also to be clogged by dirt or other matter, which will collect in the different parts of the devices. This is often the occasion of much inconvenience, and requires the taking apart and cleansing of the machinery more frequently than would be necessary were the part properly protected.

The object of this invention is to obviate the difficulties and objectionable features above named, and, to this end, It consists—

First, in the application of leather, or other suitable soft material, between the feed-bar and adjustable stop, and the feed-actuating cam or eccentric, so as to prevent such metallic surfaces from coming in contact when at work, and thereby obviating the noise attendant upon the working of sewing-machines.

Second, in connecting the needle-bar and vibratory needle-arm by means of a ball-and-socket or universal joint, which holds the two firmly together, so that they may work without any noise or rattle at the joint. The effect of this ball-and-socket connection between the arm and bar, when the two are in motion, is to impart to the needle-bar a slight and almost imperceptible rotary motion upon its axis, equal to the departure of the path of the vibratory arm from the plane in which the bar moves. This mode of compensating for the differences between the movements of the two, renders unnecessary the use of the slot and pin, or other loose connection, while the very slight rotary movement of the needle is practically imperceptible.

Third, in the employment, for the purpose of protecting and shielding the sewing-mechanism, beneath the table, of a hinged guard or case, which is jointed to the frame or bed of the machine, and can be moved so as to either entirely cover and conceal the feed and other devices, or to uncover and expose them whenever it becomes necessary.

To enable others to make and use this invention, I shall now proceed to describe the manner in which the same is or may be carried into effect.

Referring to the accompanying drawing—

L represents part of the frame of a sewing-machine, through which passes the shaft P, on the end of which is turned the eccentric pin O, fitting into the slot in the feed-bar M.

In this slot is fitted a buffer or pad, R, of leather or other suitable material, to receive the forward thrust of the eccentric pin O.

S is a circular washer, of leather or other suitable material, attached to the handle N, by means of the screw Q, which passes eccentrically through a hole in both into the frame, and binds the washer between the handle N and the face of the frame L, producing sufficient friction to prevent it being turned by the action of the feed-bar M, which, in the course of the revolution of the eccentric pin O, is forced back by a spring against the adjustable stop just referred to.

The buffer or pad, I make by first cutting long strips of leather, of the form shown in isometrical perspective view in fig. 4, and by then cutting the same into sections in width equal to the thickness of that part of the feed-bar in which it is to be inserted, or of a lesser width, sufficient, however, to produce the desired effect.

One of these strip-sections is then introduced into the cavity or recess upon the left-hand side of the eccentric O, by bending the edges *m* and *n*, and forcing it home, as indicated in fig. 4. The peculiar shape of the strip-sections, and the mode of introducing them, will produce the requisite curvature and surface of contact with the eccentric.

The operation of the feeding-mechanism is the same as in those heretofore constructed, that is to say, the feed-bar M has a vibratory up-and-down and back-and-forth motion upon the spindle or pin T.

The feed-bar, on advancing, in order to elevate the feeding-surface above the cloth-table, strikes against the washer S, the object of which is to limit the stroke, and, consequently, to regulate the length of stitches. The feed-bar is caused to recede and to depress the feeding-surface below the cloth-plate, by the eccentric O, working against the pad R. The feed-bar is, therefore, vibrated between two points, which are padded with leather, as herein shown and described.

The manner in which the second portion of my invention may be carried into effect, is shown in figs. 2 and 6.

A is the vertically-moving needle-bar, which slides up and down in bearings *a*, in the frame of the machine. Motion is imparted to it by means of the vibratory needle-arm or lever B, which is pivoted at the rear of the machine, and is vibrated by means of a cam, or its equivalent, upon the rear end of shaft P, in the usual manner.

Instead of forming a slot in the one, which shall receive a pin, fixed to the other, as has heretofore been customary, I employ a ball-and-socket connecting-device, operating substantially as will be described.

This device consists, in the present instance, of a pin, *b*, which passes through both the arm and bar, having a shoulder, *c*, upon it, which is drawn up tightly against one side of the bar by a nut, *d*, upon the end of the pin, which projects from the opposite side of the bar. That portion of the pin within the arm B has a convex form, or the equivalent of the same, as shown at *f*, fig. 6, so that while it will accurately fit the circular socket formed for it in the arm, it may, at the same time, have all the "ball-and-socket" play required.

So far, therefore, as concerns the up-and-down or vertical movements of the arm and bar, the two move together, the joint between them is not loose, as in the case of the slot and pin, and thus all liability to noise and wear, from the striking together or chattering of the parts, is obviated.

As the needle-arm vibrates upon a pivot, and as its end, which is connected with the needle-bar, moves in an arc of a circle, of which the pivot is the centre, the curved path described by the end must necessarily depart from the vertical plane in which the bar moves.

The ball-and-socket joint between the two parts admits, however, of these differences of movement, without any disturbance of the close-fitting connection between the parts, for when the needle-arm, in its reciprocating up-and-down motion, departs from the line of movement of the needle-bar, this tendency to draw away from the bar is imparted to the connecting-pin, which, in turn, draws after it the bar, thus causing the latter to have a slight and almost imperceptible oscillating rotary movement upon its axis, during each rise and fall of the arm.

The convex or rounded head of the connecting-pin, which is kept well lubricated, and can move or turn easily in its socket, allows all play to the arm and bar necessary to enable them to operate freely in the manner above stated.

That portion of the machine comprising the above-recited third feature of my invention is shown in figs. 1 and 2.

Below the bed-plate or sewing-plate D of the machine are located the feed, and the mechanism operating in connection with the needle to make the stitch. These devices it is my object to shield and protect in such manner that they may be readily uncovered and exposed to view, whenever desired.

To this end, I provide a case or guard, G, hinged to the frame, and so shaped, that when turned upon its hinge, toward the feed and other devices, it will be capable of entirely covering and enclosing them, as shown in the drawings, thus preventing them from being accidentally injured, and keeping them clear from dirt or other matter that otherwise might gather in or upon and clog them.

For convenience' sake, I prefer to secure the case G to a horizontal hinge or pivot, so that it may be swung up or down toward the sewing-plate. When in the position seen in fig. 1, all the operative parts of the sewing-mechanism below the sewing-plate are enclosed by the case and by the sewing-plate, which, in effect, forms the top of the case; and by pressing upon a thumb-piece, *h*, formed on its exterior, the case can readily be turned down upon its hinge, so as to uncover and expose to view the devices before enclosed by it.

By screwing up the pivotal pin, upon which the case is hinged, or by other suitable means, sufficient friction between the case and frame may be created to hold the former in whatever position it may be kept.

And having now fully described the nature of my invention,

I claim—

1. The combination, with the slotted and padded feeding-dog, and its operating-eccentric, of the padded feed-regulating eccentric, all constructed and operating substantially as and for the purposes set forth.

2. The combination of the vibratory needle-arm with the reciprocating needle-bar, when connected together by means of a ball-and-socket or equivalent joint, substantially as herein shown and described.

3. The combination, with the frame of the sewing-machine, of a hinged case, for enclosing and shielding those parts of the sewing and feed-mechanism, located beneath the sewing-plate or table, substantially as shown and set forth.

In witness whereof, I have hereunto set my hand, in the presence of two subscribing witnesses.

CHAS. H. WILLCOX.

Witnesses:

EDWARD P. HATCH,
GEO. F. WILSON.